United States Patent
Borremans et al.

(10) Patent No.: US 9,756,270 B2
(45) Date of Patent: Sep. 5, 2017

(54) IN-PIXEL AMPLIFICATION DEVICE AND METHOD

(71) Applicants: IMEC VZW, Leuven (BE); Vrije Universiteit Brussel, Brussels (BE)

(72) Inventors: Jonathan Borremans, Lier (BE); Linkun Wu, Leuven (BE)

(73) Assignees: IMEC vzw, Leuven (BE); Vrije Universiteit Brussel, Brussels (BE)

( * ) Notice: Subject to any disclaimer, the term of this patent is extended or adjusted under 35 U.S.C. 154(b) by 0 days.

(21) Appl. No.: 14/965,714

(22) Filed: Dec. 10, 2015

(65) Prior Publication Data

US 2016/0173804 A1 Jun. 16, 2016

(30) Foreign Application Priority Data

Dec. 16, 2014 (EP) ..................................... 14198285
Feb. 2, 2015 (EP) ..................................... 15153413

(51) Int. Cl.
*H04N 3/14* (2006.01)
*H04N 5/335* (2011.01)
*H04N 5/3745* (2011.01)
*H04N 5/369* (2011.01)
*H04N 5/355* (2011.01)

(52) U.S. Cl.
CPC ......... *H04N 5/3745* (2013.01); *H04N 5/3559* (2013.01); *H04N 5/3698* (2013.01); *H04N 5/37452* (2013.01)

(58) Field of Classification Search
CPC . H01L 27/146–27/14893; H04N 5/335–5/378; H04N 5/3745; H04N 5/37452; H04N 5/3559; H04N 5/3698
USPC ....... 348/294–324; 250/208.1; 257/225–234, 257/257, 258, 291–294, 431–438
See application file for complete search history.

(56) References Cited

U.S. PATENT DOCUMENTS

2014/0027640 A1* 1/2014 Yang ................. H01L 27/14609
250/338.4
2015/0102206 A1 4/2015 Borremans
(Continued)

FOREIGN PATENT DOCUMENTS

EP 2 863 628 A1 4/2015
EP 2 890 117 A1 7/2015
(Continued)

OTHER PUBLICATIONS

Tochigi, et al. "A Global-Shutter CMOS Image Sensor With Readout Speed of 1-Tpixel/s Burst and 780-Mpixel/s Continuous," IEEE Journal of Solid-State Circuits (2013), vol. 48, No. 1, pp. 329-338.

*Primary Examiner* — Yogesh Aggarwal
(74) *Attorney, Agent, or Firm* — Knobbe Martens Olson & Bear LLP

(57) ABSTRACT

A pixel for converting incident subatomic particles into an output voltage signal is disclosed. In one aspect, the pixel includes a photo-detector adapted to receive incident subatomic particles and generate an input voltage signal corresponding to an intensity of the received particles. The pixel also includes a passive amplifier adapted to passively amplify the input voltage signal to generate an output voltage signal. The passive amplification reduces the noise of the output voltage signal, and may have a higher quantum efficiency than typical in-pixel amplification devices and methods.

17 Claims, 6 Drawing Sheets

(56) References Cited

U.S. PATENT DOCUMENTS

2015/0189199 A1 7/2015 Borremans et al.
2015/0312502 A1 10/2015 Borremans

FOREIGN PATENT DOCUMENTS

EP 2 924 979 A1 9/2015
WO WO 2008/142051 A2 11/2008

* cited by examiner

IN-PIXEL AMPLIFICATION DEVICE AND METHOD

RELATED APPLICATIONS

This application claims priority to EP 14198285.0 filed Dec. 16, 2014, entitled "IN-PIXEL AMPLIFICATION DEVICE AND METHOD," and EP 15153413.8 filed Feb. 2, 2015, entitled "IN-PIXEL AMPLIFICATION DEVICE AND METHOD," each of which is incorporated herein by reference in its entirety

BACKGROUND

Field

The disclosed technology relates to the field of sensors, and more particularly a pixel having a built-in amplifier for a sensor.

Description of the Related Technology

CMOS image sensors include arrays of light sensitive pixels that convert incident light to voltages. Traditional sensors temporarily store the pixel outputs before amplifying them, as typically all rows of an array cannot be read simultaneously. However, there is little space for storage capacitors, which results in poor signal-to-noise performance as thermal noise is inversely proportional to capacitance. In-pixel amplification devices amplify voltages within each pixel, removing the need for storage capacitors that introduce noise. However, existing in-pixel amplification methods require multiple components, such as NMOS and PMOS devices, to effect a gain. PMOS devices reduce the quantum efficiency of the pixel. There is a need for in-pixel amplification with passive amplification within each pixel of an image sensor, as well as in-pixel amplification devices and methods requiring fewer components and having a higher quantum efficiency than existing devices and methods.

SUMMARY OF CERTAIN INVENTIVE ASPECTS

The disclosed technology includes an image sensor with in-pixel passive amplification. Such devices require fewer components and have a higher quantum efficiency than existing in-pixel amplification devices and methods One aspect of the disclosed technology is a pixel for converting incident subatomic particles into an output voltage signal. The pixel includes a particle-detector adapted to receive subatomic particles and generate an input voltage signal corresponding to an intensity of the received subatomic particles. The pixel includes a passive amplifier. The passive amplifier includes a voltage-controlled capacitor adapted to receive and store the input voltage signal at a first terminal. The capacitance of the voltage-controlled capacitor is variable between a first and second capacitance in response to a capacitor control voltage. The pixel further includes a first switch connected to the first terminal of the voltage-controlled capacitor. The first switch is adapted to selectively provide the input voltage signal to the voltage-controlled capacitor. Varying the voltage-controlled capacitor from a first capacitance to a second capacitance subjects the input voltage signal stored at the first terminal to a gain, thereby generating an output voltage signal at the first terminal.

The pixel thus comprises two elements, an incident particle sensitive element and an amplification element. The incident particle sensitive element (and any required further circuit element) generates an input voltage signal in response to incident subatomic particles. The amplification element receives said input voltage signal and performs a passive amplification to generate an output voltage signal.

In an embodiment, the incident particle sensitive element may be a photo-sensitive element (i.e. a photo-detector or a photon-sensitive element). In this embodiment, the subatomic particles are photons. In other embodiments, the "subatomic particle" may include photons as well as massive particles such as electrons. Such a photo-sensitive element in combination with suitable circuit elements generates an input voltage signal in response to incident light. The photo-detector or photo-sensitive element may include a photoresistor, a photodiode, a phototransistor, a reverse-biased light emitting diode, or any other light sensitive sensor.

Other possible photo-sensitive circuits include: a photodiode, a reset gate, a transfer gate, and a source follower field-effect transistor. Such a photo-detector may be, for example, arranged in a 3 T or 4 T configuration or cell.

Passive amplification is achieved through the storage of a charge on a first terminal of a capacitor, wherein said capacitor has a controllable capacitance. When the capacitance of the capacitor is changed, as charge is conserved, the magnitude of the associated voltage to the stored charge is changed. Thus the stored input voltage signal may be subject to a gain to generate the output voltage signal at the first terminal. The said output voltage signal therefore corresponds to an amplification of the input signal.

Using such a passive amplifier in the pixel confers several benefits. For example, very few components are required, and hence can be implemented with a small area footprint. In an embodiment, no PMOS devices are included in the pixel circuit, leading to greater quantum efficiency of the pixel. In this case, each switch used within the in-pixel passive amplifier circuit may be implemented as an NMOS transistor.

Passive amplifiers consume little power compared to active devices, resulting in significant power and thermal heat reduction. Further, due to the simplicity of passive amplifiers, pixels with passive amplifiers may be made to operate at a higher speed than pixels with active devices, as no feedback or high current is required.

In an embodiment, a second terminal of the voltage-controlled capacitor is directly connected to a ground, e.g. 0V, supply.

In an embodiment, the magnitude of the input voltage signal is no greater than 1.5V. In an embodiment, the magnitude of the input voltage is no greater than 1V.

In an embodiment, the second capacitance is less than the first capacitance such that the input voltage signal is subject to a gain greater than one. In an embodiment, the magnitude of the first capacitance is no greater than four times the second capacitance. The amplifier thus provides moderate gain but this can be achieved with a very simple circuit.

In an embodiment, the controllable capacitance of the voltage-controlled capacitor has a maximum possible capacitance of no more than 200 fF. In an embodiment, the controllable capacitance of the voltage-controlled capacitor has a maximum possible capacitance of no more than 100 fF.

In an embodiment, a switch, for example the first switch, includes a known transistor, such as a metal-oxide-semiconductor field-effect-transistor (MOSFET).

In an embodiment, the voltage-controlled capacitor includes the first terminal, a second terminal adapted to receive the capacitor control voltage; and a third terminal connected to a constant voltage supply. In an embodiment, the capacitor control voltage at the second terminal controls the capacitance of the voltage controlled capacitor.

In other words, in an embodiment the voltage-controlled capacitor may have a first terminal to which the input voltage signal is stored, and another terminal connected to a constant voltage supply (e.g. ground, 0V). A further terminal may be provided to the voltage-controlled capacitor to which the capacitor control voltage is applied. The variance of the capacitor control voltage may vary the capacitance of the voltage-controlled capacitor, for example, between the first terminal and the other terminal connected to a constant voltage supply. The magnitude of the capacitor control voltage may be proportional to the capacitance of the voltage-controlled capacitor.

In an embodiment, a simpler voltage-controlled capacitor includes only two terminals, the first terminal to which the input voltage signal is stored and a further terminal to which the capacitor control-voltage is applied. The variance of the capacitor control voltage may vary the capacitance between the first terminal and the further terminal to apply gain to an input voltage signal stored at the first terminal.

In an embodiment, the voltage-controlled capacitor includes a metal-oxide-semiconductor capacitor (MOSCAP).

A MOSCAP enables change in capacitance through a selectively applied voltage (i.e. the capacitor control voltage). An exemplary MOSCAP may comprise a gate contact, a gate dielectric, a body dielectric and a body contact connected serially. The application of a voltage to the gate may selectively cause a depletion layer to form in the dielectric material of the body dielectric. The presence of a depletion region may either increase or decrease the capacitance of the dielectric material and hence the capacitor.

In an embodiment, the capacitor control voltage is a two-level voltage signal. The capacitor control voltage may therefore be provided from a further switch, only togglable between two preset voltage supplies.

In an embodiment, the capacitor control voltage may be provided from a digital controller such as a microprocessor.

In an embodiment, the pixel may further comprise at least one output element comprising an output buffer adapted to receive and process the output voltage signal for provision to an external component.

The output buffer may be a known column buffer or voltage buffer amplifier. Such an output buffer is adapted to isolate the pixel from external components such as pixel reading circuitry. This ensures that any associated external components do not unduly load the pixels. Such an output buffer may comprise a field-effect transistor (FET) arranged in a source follower configuration, said FET arrangement having a gain of 1. More particularly, the FET may be a metal-oxide-semiconductor field-effect transistor (MOSFET).

In an embodiment, the at least one output element may further include at least one memory cell including a storage capacitor adapted to receive and store the output voltage signal. The at least on output element may further include a second switch, connected between the storage capacitor and the voltage-controlled capacitor, adapted to selectively provide the output voltage signal to the storage capacitor. The output buffer may be adapted to receive the output voltage signal from the storage capacitor of the memory cell.

In order to temporarily store the pixel output, an embodiment may use a capacitor to hold the voltage at a terminal. The second switch allows the voltage currently stored on the first terminal of the voltage-controlled capacitor to be selectively passed to the storage capacitor, such that only the output voltage signal is provided to the storage capacitor and not, for example, the input voltage signal.

An embodiment includes a plurality of such output elements adapted so that a plurality of separate, different, output voltage signals can be stored on a storage capacitor of a respective, different, output element. Each output voltage signal may therefore correspond to a different input voltage signal and, therefore, a different intensity of light incident on the photo-detector.

There may be provided a plurality of memory cells in each of at least one output element, such that a plurality of separate, different, output voltage signals can be stored on a storage capacitor of a respective memory cell.

In an embodiment, the pixel further includes a pixel buffer adapted to pass the input voltage signal from the photo-detector to the passive amplifier. Thus the input voltage signal may be passed from a photo-detector through a buffer to be supplied to the passive amplifier, ensuring the passive amplifier does not unduly load the photo-detector. Such a pixel buffer may include a field-effect transistor (FET) arranged in a source follower configuration, said FET arrangement having a gain of 1. In an embodiment, the FET is a metal-oxide-semiconductor field-effect transistor (MOSFET).

In an embodiment, the pixel is adapted to perform correlated double sampling, a known method of reducing noise in a pixel for an image sensor. In an embodiment, the passive amplifier further includes an input capacitor connected to the first switch and a third switch adapted to selectively provide a precharging voltage to the first terminal of the voltage-controlled capacitor.

In an embodiment, a first terminal of the input capacitor is connected to the first switch, and a second terminal is adapted to controllably receive the input voltage signal.

In an embodiment, the passive amplifier is arranged such that the third switch is connected to the first terminal of the voltage controlled capacitor. Thus, when the precharging voltage is applied to the first terminal of the voltage-controlled capacitor, the same precharging voltage may also be selectively provided to the first terminal of the input capacitor through the first switch.

In an alternative embodiment, the third switch is connected to the first terminal of the input capacitor. Thus, when the precharging voltage is applied to the first terminal of the input capacitor, the same precharging voltage may also be selectively provided to the first terminal of the voltage-controlled capacitor through the first switch.

An embodiment may include an input buffer positioned following the first terminal of the input capacitor to buffer the signal provided on the first terminal of the input capacitor.

In an embodiment, the pixel may be made to operate (i.e. periodically generate an output voltage signal corresponding to incident light) at no more than 1 GHz. In an embodiment, the pixel may be made to operate at 100 MHz. In an embodiment, the pixel may be made to operate at 25 MHz.

Another application of the disclosed technology is an image sensor including a plurality of pixels as previously embodied. Each pixel in such an image sensor may include a plurality of output elements, such that each output element of pixel can store a respective output voltage signal. Such an image sensor may thereby store a number of images. Thus if each pixel of an image sensor has, for example, five output elements, it follows that five images may be stored in the said image sensor.

Each output element of a pixel may also comprise a plurality of memory cells, such that each memory cell may store a respective output voltage signal; and thereby the collective output elements of an image sensor may store a plurality of images.

For example, if a pixel of an image sensor has five output elements, wherein each output element comprises five memory cells, it follow that a total of twenty-five images may be stored in the said image sensor.

Another aspect of the disclosed technology is an image sensor with a digital controller. In an embodiment, the digital controller is a microprocessor. In an embodiment, the digital controller is adapted to control at least one of the first switch and the second switch. In an embodiment, the digital controller is adapted to control the capacitor control voltage, such as in the form of a two-level voltage signal.

Another application of the disclosed technology is a method of providing an output voltage signal indicative of the number of incident subatomic particles. The method includes receiving subatomic particles at a particle-detector and generating an input voltage signal corresponding to an intensity of the received subatomic particles. The method includes selectively passing the input voltage signal to a first terminal of a voltage-controlled capacitor. The method includes storing the input voltage signal at the first terminal of a voltage-controlled capacitor. In an embodiment, the voltage-controlled capacitor is at a first capacitance and varying the capacitance of the voltage-controlled capacitor from the first capacitance to a second capacitance subjects the input voltage signal to a gain to generate an output voltage signal.

That is to say, the method includes using a photo-sensitive element to generate an input voltage signal and subsequently passively amplify the input voltage signal with an amplification element. The photo-sensitive element may include a known photo-detector such as a photodiode or a photoresistor.

In an embodiment, the amplification element includes a voltage-controlled capacitor and a first switch. The first switch passes the input voltage signal to a first terminal of the voltage-controlled capacitor. At any period after the first terminal of the voltage-controlled capacitor has charged to the level of the input voltage signal, the first switch disconnects the first terminal from the input voltage signal. The voltage-controlled capacitor is subsequently switched from a first capacitance to a second capacitance in response to, for example, a capacitor control voltage. As the charge on the first terminal of the voltage-controlled capacitor is conserved, but the capacitance changes, the voltage level on the first terminal is transformed proportional to the change of capacitance. Thus a voltage level on the first terminal, corresponding to the level of the input, is subject to a gain and thereby an output voltage signal is generated on the first terminal.

In an embodiment, the method further includes providing the output voltage signal to an output buffer, thereby generating a buffered output voltage signal for provision to an external component.

In an embodiment, the method further includes selectively storing the output voltage signal at a storage capacitor to subsequently provide said output voltage signal to the output buffer.

In an embodiment, the method further includes transmitting the input voltage signal through a buffer prior to selectively passing the input voltage to the first terminal of the voltage-controlled capacitor.

In an embodiment, the method is adapted to perform correlated double sampling.

In an embodiment, generating the input voltage signal further includes charging a first terminal of an input capacitor and the first terminal of the voltage-controlled capacitor to a precharging voltage, wherein the first terminal of the input capacitor and the first terminal of the voltage-controlled capacitor are selectably connected. In an embodiment, generating the input voltage signal further includes charging a second terminal of the input capacitor to a reset voltage while maintaining the precharging voltage at the first terminal of the input capacitor and the first terminal of the voltage-controlled capacitor.

In an embodiment, passing the input voltage signal to a first terminal of the voltage-controlled capacitor includes disconnecting the precharging voltage from the first terminal of the input capacitor and the first terminal of the voltage-controlled capacitor. In an embodiment, passing the input voltage signal to a first terminal of the voltage-controlled capacitor includes applying the input voltage signal to the second terminal of the input capacitor thus coupling the difference between the input voltage signal and the reset voltage to the first terminal of the input capacitor, thereby shifting the level of the precharging voltage by the same difference to generate a difference voltage at the first terminal of the input capacitor. In an embodiment, passing the input voltage signal to a first terminal of the voltage-controlled capacitor includes selectively passing the difference voltage to the first terminal of the voltage-controlled capacitor.

In an embodiment, varying the capacitance of the voltage-controlled capacitor includes varying the capacitance of the voltage-controlled capacitor between a first capacitance and a second capacitance, thereby subjecting the difference voltage to a gain to generate the output voltage signal.

BRIEF DESCRIPTION OF THE DRAWINGS

Examples will now be described in detail, with reference to the accompanying drawings.

DETAILED DESCRIPTION OF CERTAIN ILLUSTRATIVE EMBODIMENTS

In one aspect, the disclosed technology is implemented as a pixel for converting incident subatomic particles into an output voltage signal, making use of passive in-pixel amplification. The amplification makes use of a circuit with a controllable capacitance. In another aspect, the disclosed technology is implemented as an image sensor that includes a plurality of such pixels.

Figure 1:
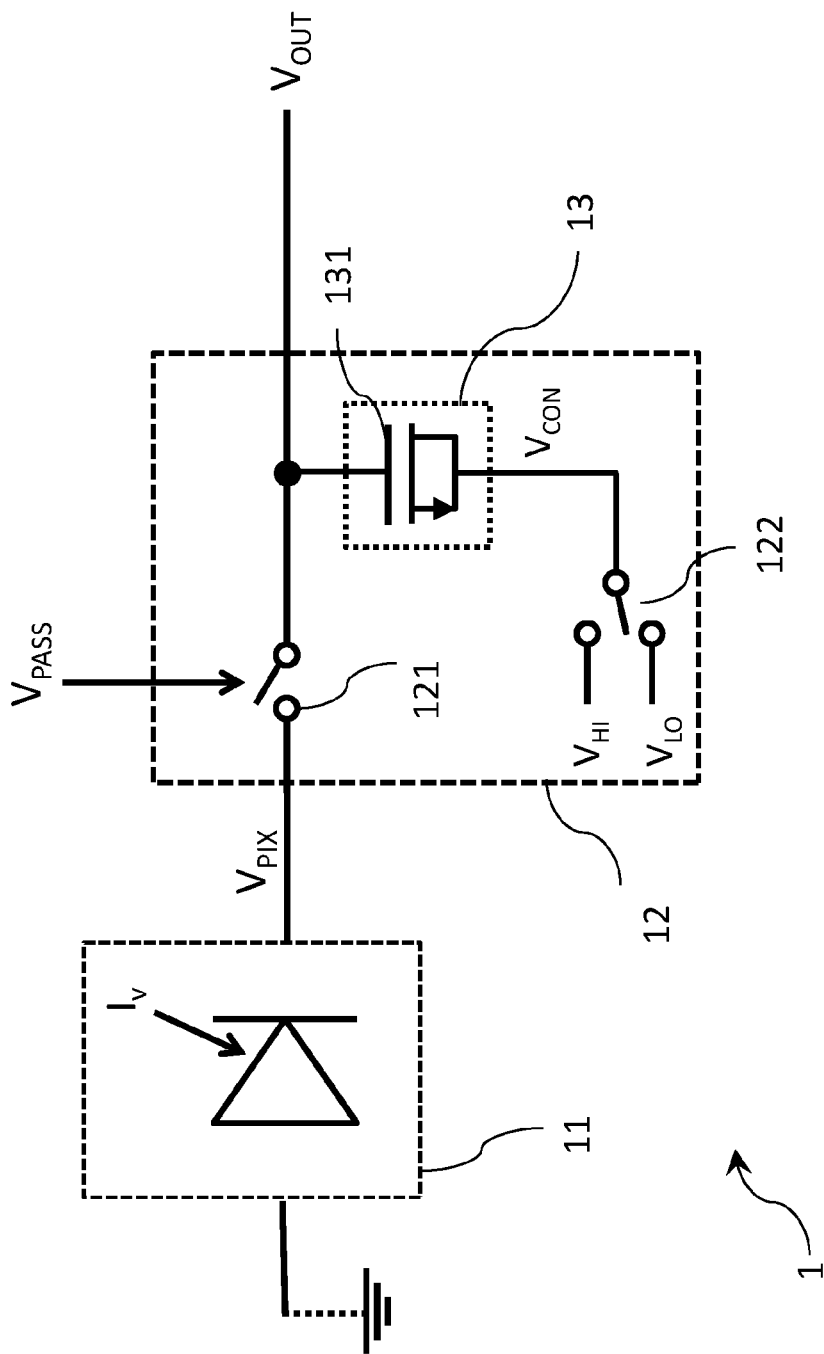
FIG. 1 illustrates a pixel according to a first exemplary embodiment.

With reference to FIG. 1, a first embodiment of a pixel 1 is shown. The pixel comprises a particle-detector arrangement 11 and a passive amplifier 12. In this and subsequent embodiments, the particle-detector arrangement 11 is a photo-detector arrangement, said photo-detector arrangement comprising a known photo-diode and associated circuit elements, that generates an input voltage signal ($V_{PIX}$) in response to incident light ($I_V$). The passive amplifier 12 comprises a first switch 121 and a voltage-controlled capacitor 13, which has a variable capacitance in response to a capacitor control voltage ($V_{CON}$).

One sequence of a possible operation of the pixel 1 is described below. At a first point in time, the input voltage signal ($V_{PIX}$) is passed to a first terminal 131 of the voltage-controlled capacitor 13 by the first switch 121. The passing of the input voltage signal is controlled by a passing voltage $V_{PASS}$ which controls the first switch 121. The first terminal 131 of the voltage-controlled capacitor is charged at least until the associated magnitude of the voltage stored at the first terminal of the voltage-controlled capacitor is equal to the magnitude of the input voltage signal.

At a second point in time, when the first terminal of the voltage-controlled capacitor is charged to the magnitude of the input voltage signal, the first switch 121 is turned off. Thus the input voltage signal is stored and isolated at the first terminal of the voltage-controlled capacitor.

At a third point in time, the capacitance of the voltage-controlled capacitor is changed. As the charge (e.g. Q) at the first terminal of the voltage-controlled capacitor is preserved, and due to the relationship between charge, capacitance and voltage, the magnitude of the voltage stored at the first terminal of the voltage-controlled capacitor is therefore changed. This can be more easily understood by considering the following relationship:

$$Q=CV \quad (1)$$

In accordance with equation 1, as Q remains the same and capacitance changes, the voltage must proportionally change. The voltage stored at the first terminal of the voltage-controlled capacitor is therefore subject to a gain when the capacitance of the voltage-controlled capacitor is changed. This generates an output voltage signal ($V_{OUT}$) on the first terminal of the voltage-controlled capacitor. This can be otherwise thought of as passively applying a gain to the input voltage signal to generate the output voltage signal.

The capacitor control voltage of the first embodiment is a two-level voltage signal, selectively togglable between a first voltage level (e.g. $V_{HI}$) and a second voltage level (e.g. $V_{LO}$). The switching between the first voltage level and the second voltage level is performed by a dedicated capacitor control switch 122. The voltage-controlled capacitor is, therefore, varied between a first and second capacitance corresponding to the first and second voltage level of the two-level voltage signal.

In order to effect a non-fractional gain, the first voltage level may be high and may cause a first capacitance of the capacitor. The second voltage may be low, and may cause a second capacitance of the capacitor, wherein said second capacitance is lower than the first capacitance of the capacitor.

Alternatively, the first voltage level may be low and may cause a first capacitance of the capacitor. The second voltage may be high, and may cause a second capacitance of the capacitor, wherein said second capacitance is lower than the first capacitance of the capacitor.

Of course, to effect a fractional gain, the second capacitance of the capacitor may be higher than the first capacitance of the capacitor.

It will be understood that the first terminal may be charged by the input voltage signal for a set period of time, i.e. the first switch is periodically switched on and off. That is to say that the time period between the first point in time and the second point in time may be known and constant for successive repetitions of the above described sequence.

Figure 2:
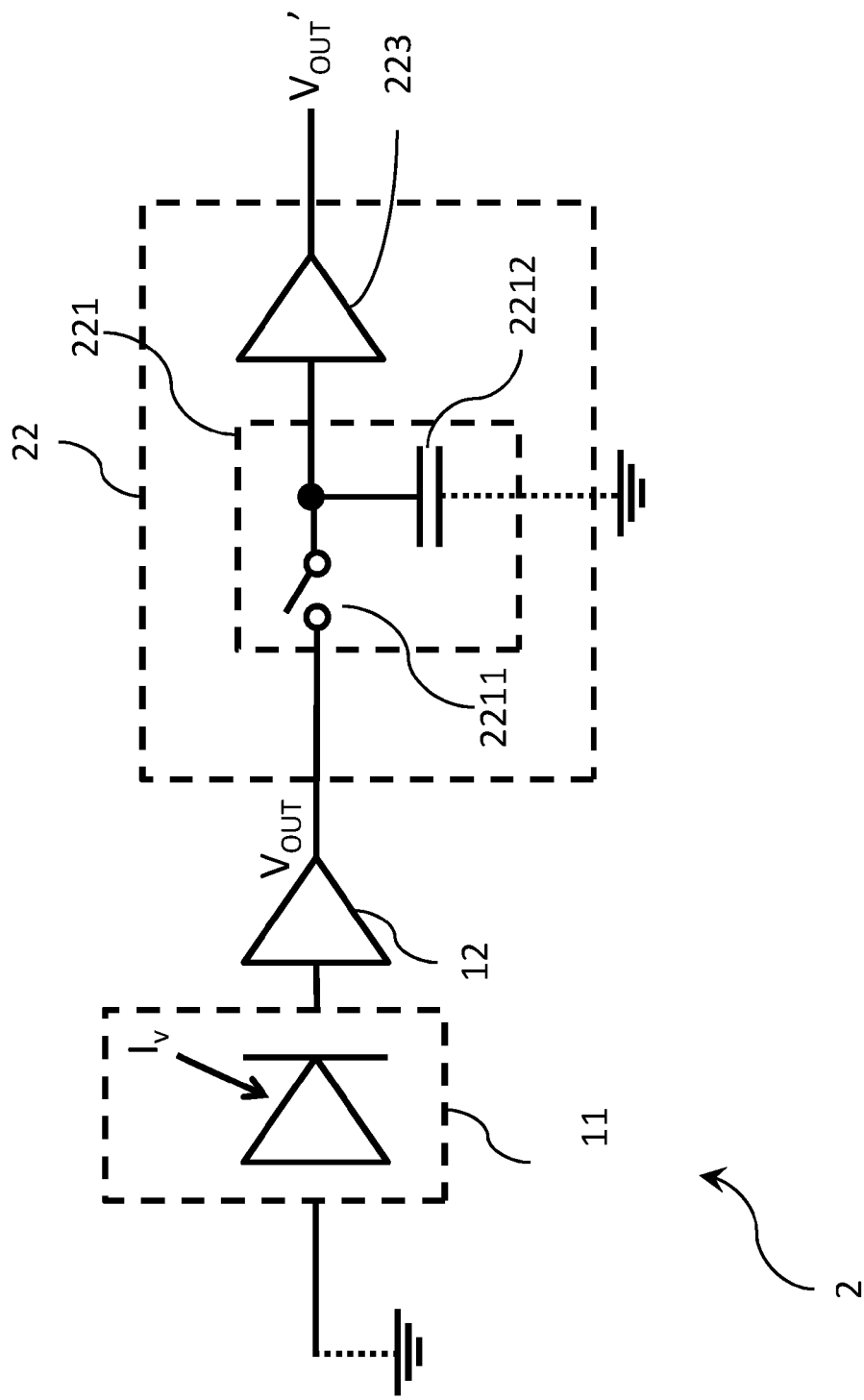
FIG. 2 illustrates a pixel according to a second exemplary embodiment.

Turning to FIG. 2, a second embodiment of a pixel 2 is shown. The pixel comprises a photo-detector 11, a passive amplifier 12 (both as embodied in the first embodiment) and an output element 22. The output element comprises a memory cell 221 and an output buffer 223, wherein the memory cell comprises a second switch 2211 and a storage capacitor 2212. The photo-detector 11 and passive amplifier 12 work in the same manner as the equivalent components of the first embodiment. The storage capacitor functions as a memory cell.

Accordingly, one possible sequence of a possible operation for the second embodiment may initially comprise the same sequence as previously described with regard to the first embodiment. Such a sequence may further comprise the following.

At a fourth point in time, the output voltage signal ($V_{OUT}$), supplied to the memory cell of the output element, is passed to the storage capacitor 2212 by the second switch 2211. Said storage amplifier is thereby charged until the associated magnitude of the voltage stored at the storage capacitor (i.e. the voltage across the storage capacitor) is equal to the magnitude of the output voltage signal. The output voltage signal can therefore be considered to be stored on the storage capacitor.

At a fifth point in time, when the storage capacitor is charged to the magnitude of the output voltage signal, the second switch is turned off. Thus the storage capacitor is isolated from the passive amplifier, but has a stored voltage which may be considered to be the output voltage signal. The said stored voltage (i.e. output voltage signal) is supplied to the output buffer for provision to an external component (not shown). The output buffer may comprise, for example, a field-effect transistor (FET) arranged in a source follower configuration, said FET arrangement having an approximate gain of 1. More particularly, the FET may be a metal-oxide-semiconductor field-effect transistor (MOSFET). Thus, the output buffer may generate an equivalent voltage output signal (e.g. $V_{OUT}'$) for said external component.

The total above described sequence, comprising five points in time, may be repeated to allow periodic or controllable sampling of light intensity incident on the photo-detector.

Figure 3:
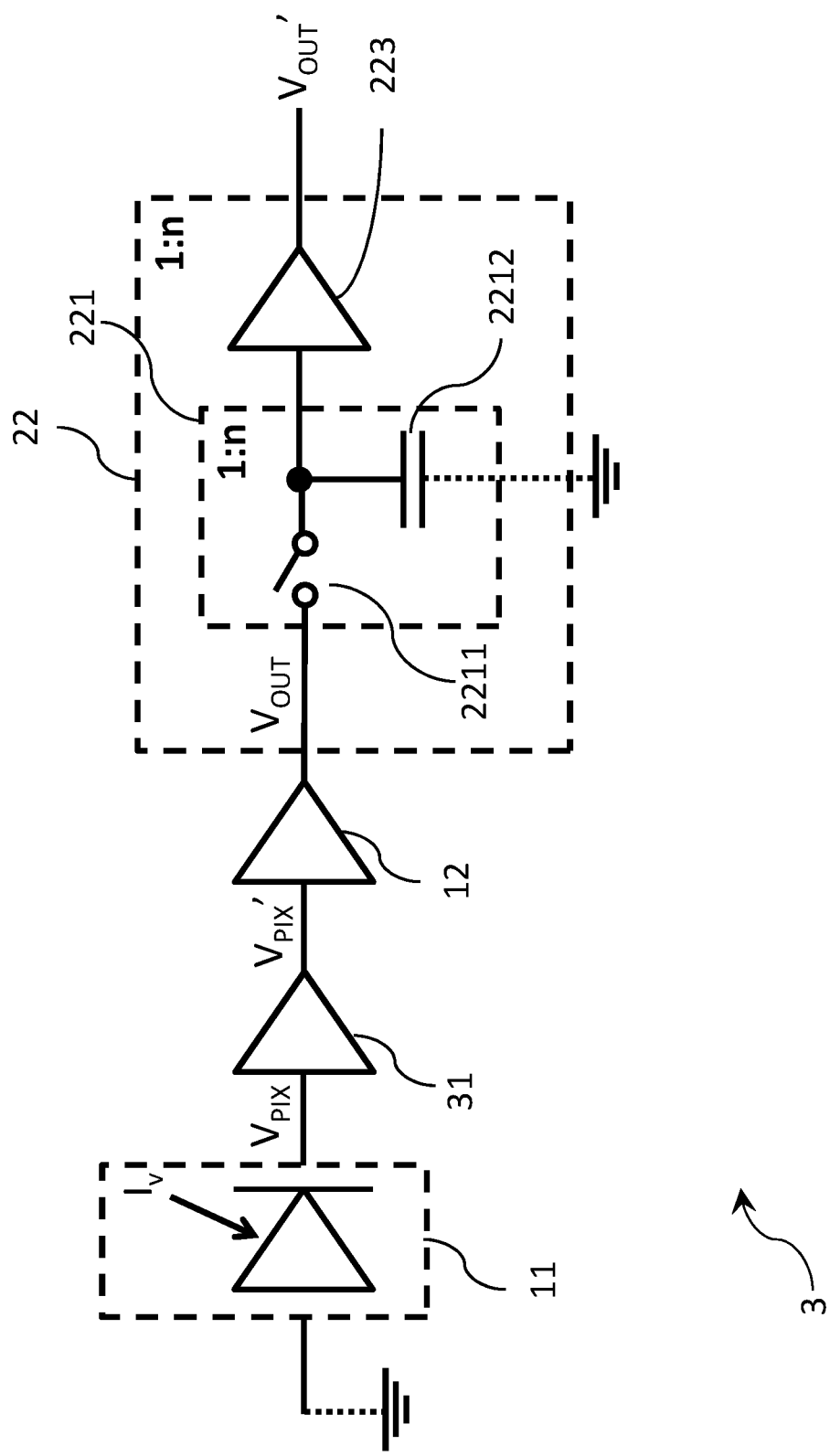
FIG. 3 illustrates a pixel according to a third exemplary embodiment.

A third embodiment of a pixel 3 is illustrated in FIG. 3. Pixel 3 comprises all the elements of the second embodiment of a pixel 2 and further comprises an input buffer 31, as well as the at least one further output element 22 as in the example of FIG. 2, wherein the at least one further output element 22 comprises at least one memory cell 221.

The input buffer 31 receives the input voltage signal ($V_{PIX}$) from the photo-detector 11 for provision to the passive amplifier 12 as an equivalent input voltage signal ($V_{PIX}'$). The input buffer may be, for example, a field effect transistor in a source follower configuration with an approximate voltage gain of 1.

There may be provided a plurality of memory cells 221, such that a plurality of consecutive readings and subsequent amplification of the input voltage signal may be stored. Each memory cell 221 may, therefore, be considered to store a different associated output voltage signal for provision to an external element via an output buffer 223. Such an external element may selectively choose which output voltage signal, supplied by a different external element, to receive.

There may be one or more output elements comprising one or more memory cells, which may allow, for example, an output buffer 223 to be shared between a plurality of memory cells. There are also embodiments within the scope of the claims wherein each memory cell is associated with a single output buffer 223.

In other words, providing a plurality of memory cells may enable a possible image sensor, which comprises a plurality of the pixels 3, to undertake burst imaging.

Figure 4:
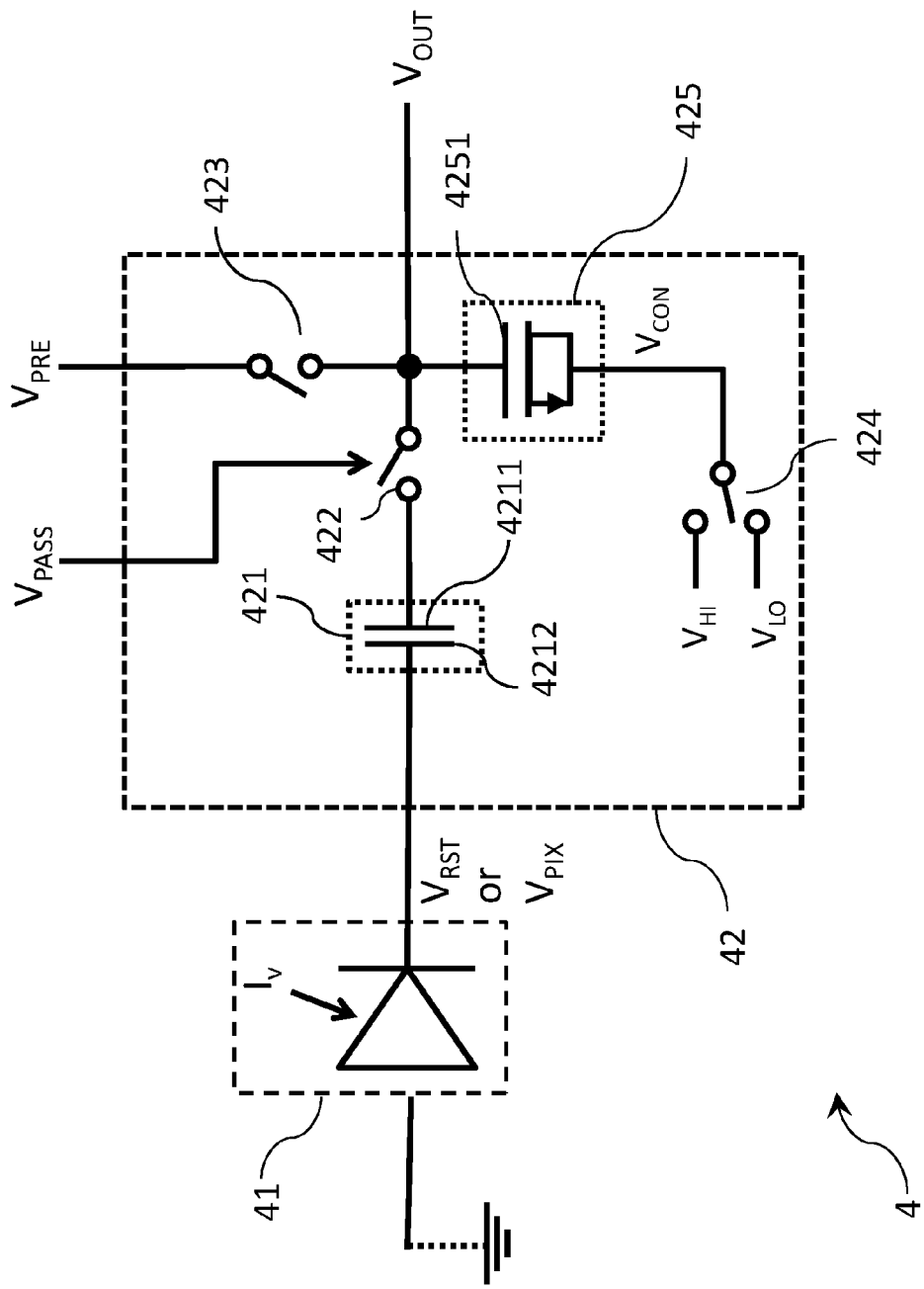
FIG. 4 illustrates a pixel for correlated double sampling according to a fourth exemplary embodiment.

A fourth embodiment of a pixel 4 is shown in FIG. 4, said embodiment is adapted to provide correlated double sampling (CDS) of incident light on the pixel. The pixel 4 comprises a photo-detector 41 and passive amplifier 42. In this embodiment, the photo-detector 41 is a known photo-diode that generates an input voltage signal ($V_{PIX}$) in response to incident light, the photo-detector 41 may also generate a reset voltage $V_{RST}$ corresponding to a voltage required to reset the photo-detector. The passive amplifier 42 comprises a first switch 422 and a voltage-controlled capacitor 425, which has a variable capacitance in response to a capacitor control voltage ($V_{CON}$). The passive amplifier further comprises a third switch 423, and an input capacitor 421.

In this embodiment, the third switch 423 selectively connects the precharging voltage ($V_{PRE}$) directly to the first terminal 4251 of the voltage-controlled capacitor 425. The precharging voltage is also selectively supplied to the first terminal 4211 of the input capacitor 421 via the first switch 422.

In an alternative embodiment the pixel may be arranged such that the third switch selectively connects the precharging voltage ($V_{PRE}$) directly to the first terminal 4211 of the input capacitor 421. In such an embodiment, the precharging voltage may be selectively supplied to the first terminal 4251 of the voltage-controlled capacitor 425 via the first switch 422.

One sequence of a possible operation of the pixel 4 is described below.

At a first point in time both the first switch 422 and the third switch 423 are closed, thereby applying a constant precharging voltage ($V_{PRE}$) to a first terminal 4251 of the voltage-controlled capacitor 425 and a first terminal 4211 of the input capacitor 421. Both the first terminal of the voltage-controlled capacitor and the first terminal of the input capacitor are charged until the associated magnitude of the voltage stored on each terminal (e.g. relative to a ground) is the same as the constant precharging voltage. Meanwhile, the second terminal 4212 of the input capacitor 421 is connected, to the pixel output which is initially set to a reset state, being a constant reset voltage ($V_{RST}$). The second terminal of the input capacitor is charged until the associated magnitude of the voltage stored on the second terminal of the input capacitor (e.g. relative to a ground) is the same as the constant reset voltage.

At a second point in time the third switch 423 is turned off, thereby disconnecting the first terminal of the voltage-controlled capacitor and the first terminal of the input capacitor from the precharging voltage.

At a third point in time the second terminal 4212 of the input capacitor 421 is connected, by switching the signal output from the pixel such that the pixel is no longer in the reset state, to receive the input voltage signal ($V_{PIX}$). The second terminal of the input capacitor is therefore charged or discharged such that the associated magnitude of the voltage at the second terminal of the input capacitor is equal to the input voltage signal. The difference in voltage, and hence charge, caused by this change (i.e. $V_{RST}-V_{PIX}$) is pushed across the capacitor 421. This change in charge is distributed to the first terminal of the voltage controlled capacitor to generate a difference signal on the first terminal of the voltage-controlled capacitor. The two capacitors (input capacitor and voltage-controlled capacitor) act as a capacitor divider, and thus cause the voltage different ($V_{RST}-V_{PIX}$) to undergo a fractional gain or capacitive division. Hence the difference signal (i.e. $V_{PRE}-A(V_{RST}-V_{PIX})$), where A is a fractional gain dependent upon the change of voltage applied to the second terminal of the input capacitor.

In other words, at a first point in time, the input 4212 of the input capacitor 421 samples a reset voltage ($V_{RST}$). Concurrently, the output 4211 of the input capacitor 421 and the input 4251 of the voltage-controlled capacitor 425 sample a precharging voltage ($V_{PRE}$). At a second point in time, the output 4211 of the input capacitor and the input 4251 of the voltage-controlled capacitor 425 are isolated from the precharging voltage. The input 4212 of the input capacitor is subsequently connected, at a third point in time, to the input voltage signal ($V_{PIX}$). This causes the change in voltage on the input of the input capacitor ($V_{RST}-V_{PIX}$) to be subject to capacitive division across the input capacitor and the voltage controlled capacitor. The fractional gain (A) may be calculated using a conventional understanding of capacitive division, that is:

$$A = \text{Fractional Gain} = \frac{C_{IC}}{C_{IC} + C_{VCC}} \quad (2)$$

In equation 2, the capacitance of the input capacitor is $C_{IC}$ and the capacitance of the voltage-controlled capacitor is $C_{VCC}$. Thus the precharging voltage ($V_{PRE}$) on the input of the voltage-controlled capacitor is subject to a voltage shift proportional to the change in voltage on the input of the input capacitor (i.e. $V_{PRE}-A(V_{RST}-V_{PIX})$).

At a fourth point in time, the first switch 422 is turned off, such that the voltage-controlled capacitor is disconnected from the input capacitor. Thus the difference signal is stored and isolated at the first terminal of the voltage-controlled capacitor.

At a fifth point in time, the capacitance of the voltage-controlled capacitor is changed. This change in capacitance induces a passive amplification to the difference signal, in accordance with the previous explanation, and thereby generates the output voltage signal ($V_{OUT}$). The change in capacitance is caused by the change of an applied capacitor control voltage $V_{CON}$. That is to say, in this embodiment, the capacitor control voltage is togglable between two voltage levels $V_{HI}$ and $V_{LO}$, and is controlled by the second switch 424. The varying between the two voltage levels induces a chance in capacitance in the voltage-controlled capacitor.

It will be understood that the pixel 4 may further comprise at least one output element as, for example, previously embodied as the output element 22. In an embodiment, the pixel 4 may comprise an input buffer (e.g. input buffer 31) supplied prior to the passive amplifier 42 for provision of the input voltage signal.

Each pixel may also comprise a memory cell, to enable a stored image to be read out subsequently.

Figure 5:
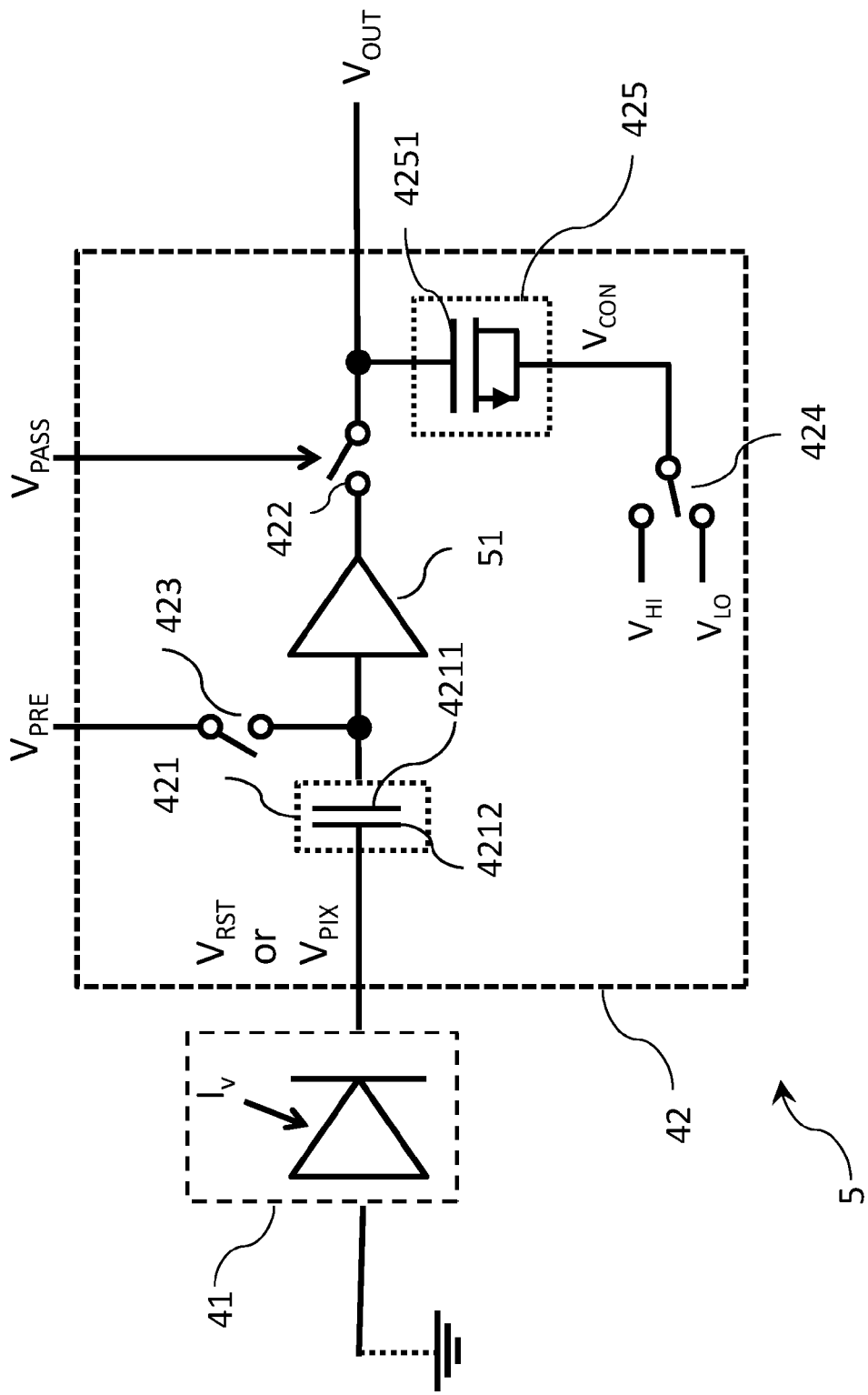
FIG. 5 shows a pixel for correlated double sampling according to a fifth exemplary embodiment.

A fifth embodiment of a pixel 5, as depicted in FIG. 5, may comprise the same elements of the fourth embodiment, and further comprising an input buffer 51.

The input buffer is placed between the input capacitor 421 and the first switch 422, providing the signal stored on the first terminal 4211 of the input capacitor 421 to the first terminal 4251 of the voltage controlled capacitor 425 via first switch 422. The third switch 423 selectively connects the precharging voltage ($V_{PRE}$) directly the signal stored on the first terminal 4211 of the input capacitor 421 and the input of the input buffer 51.

Therefore, the sequence of the possible operation described with regard to the fourth embodiment of FIG. 4 may be adapted wherein the constant precharging voltage is applied to the first terminal 4211 of the input capacitor 421 by the third switch 423 and a level-shifted precharging voltage is therefore applied to the first terminal of the voltage-controlled capacitor 4251, via input buffer 51 and the first switch 422. The said sequence may also be adapted such that, at the third point in time, the difference in voltage is passed through the input buffer 51 to the first terminal 4251 of the voltage-controlled capacitor 425.

The provision of the input capacitor buffer may result in a lower capacitor division across the input capacitor and the voltage-controlled capacitor. That is, the fractional gain (A) may be made to be closer to one.

Figure 6:
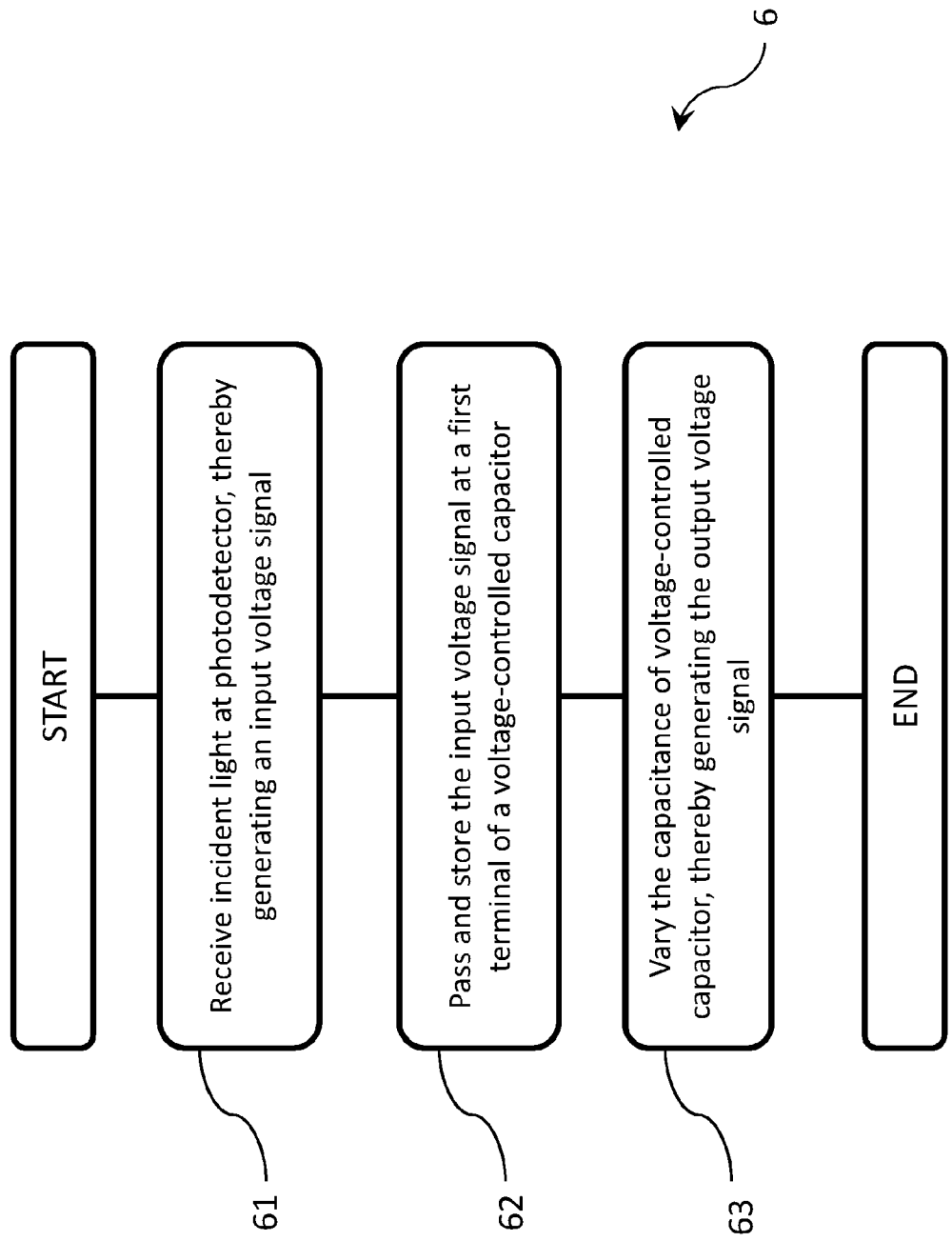
FIG. 6 portrays a method for converting incident light into an output voltage signal according to an embodiment.

With reference to FIG. 6, a method 6 of converting incident light into an output voltage signal is illustrated. In block 61, method 6 receives incident light at a photodetector, thereby generating an input voltage signal corresponding to the intensity of the incident light. In block 62, method 6 selectively passes the input voltage signal to a first terminal of a voltage-controlled capacitor storing said input voltage signal at the first terminal of a voltage-controlled capacitor, wherein said voltage-controlled capacitor is at a first capacitance. In block 63, method 6 varies the capacitance of the voltage-controlled capacitor from the first capacitance to a second capacitance, thereby subjecting the input voltage signal to a gain to generate an output voltage signal.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. As will be recognized, certain embodiments of the invention described herein can be embodied within a form that does not provide all of the features and benefits set forth herein, as some features can be used or practiced separately from others. The scope of the invention disclosed herein is indicated by the appended claims rather than by the foregoing description. All changes which come within the meaning and range of equivalency of the claims are to be embraced within their scope. Thus, the present invention is not intended to be limited to the examples shown herein but is to be accorded the widest scope consistent with the principles and novel features disclosed herein.

What is claimed is:

1. A pixel for converting incident subatomic particles into an output voltage signal, the pixel comprising:
   a particle-detector adapted to receive subatomic particles and generate an input voltage signal corresponding to an intensity of the received subatomic particles; and
   a passive amplifier comprising:
      a voltage-controlled capacitor adapted to receive and store the input voltage signal at a first terminal, wherein the capacitance of the voltage-controlled capacitor is variable between a first capacitance and a second capacitance in response to a capacitor control voltage, wherein the voltage-controlled capacitor comprises:
         the first terminal,
         a second terminal adapted to receive the capacitor control voltage, and
         a third terminal connected to a constant voltage supply, and wherein the capacitor control voltage at the second terminal controls the capacitance of the voltage-controlled capacitor; and
      a first switch, connected to the first terminal of the voltage-controlled capacitor, adapted to selectively provide the input voltage signal to the voltage-controlled capacitor,
      wherein varying the voltage-controlled capacitor from the first capacitance to the second capacitance subjects the input voltage signal stored at the first terminal to a gain, thereby generating an output voltage signal at the first terminal.

2. The pixel of claim 1, wherein the voltage-controlled capacitor is a metal-oxide-semiconductor capacitor.

3. The pixel of claim 1, further comprising at least one output element comprising an output buffer adapted to receive and process the output voltage signal for provision to an external component.

4. The pixel of claim 3, wherein the at least one output element further comprises at least one memory cell, each memory cell comprising:
   a storage capacitor adapted to receive and store the output voltage signal; and
   a second switch connected between the storage capacitor and the voltage-controlled capacitor, wherein the second switch is adapted to selectively provide the output voltage signal to the storage capacitor,
   wherein the output buffer is adapted to receive the output voltage signal from the storage capacitor of the at least one memory cell.

5. The pixel of claim 1, further comprising a pixel buffer adapted to pass the input voltage signal from the photodetector to the passive amplifier.

6. The pixel of claim 1 adapted to perform correlated double sampling, wherein the passive amplifier further comprises:
   an input capacitor connected to the first switch; and
   a third switch adapted to selectively provide a precharging voltage to the first terminal of the voltage-controlled capacitor.

7. The pixel of claim 6, further comprising an input buffer between the input capacitor and the voltage-controlled capacitor.

8. The pixel of claim 1, wherein the capacitor control voltage is a two-level voltage signal.

9. An image sensor or electronic device comprising a plurality of pixels according to claim 1.

10. A method of providing an output voltage signal indicative of incident subatomic particles, the method comprising:
    receiving subatomic particles at a particle-detector and thereby generating an input voltage signal corresponding to an associated intensity of the received subatomic particles;
    selectively passing the input voltage signal to a first terminal of a voltage-controlled capacitor and storing the input voltage signal at the first terminal of the voltage-controlled capacitor, wherein the voltage-controlled capacitor is at a first capacitance, wherein the voltage-controlled capacitor comprises:
       the first terminal,
       a second terminal adapted to receive the capacitor control voltage, and
       a third terminal connected to a constant voltage supply, and wherein the capacitor control voltage at the second terminal controls the capacitance of the voltage-controlled capacitor; and varying the capacitance of the voltage-controlled capacitor from the first capacitance to a second capacitance, thereby subjecting the input voltage signal to a gain to generate an output voltage signal.

11. The method of claim 10, further comprising providing the output voltage signal to an output buffer, thereby generating a buffered output voltage signal for provision to an external component.

12. The method of claim 11, further comprising selectively storing the output voltage signal at a storage capacitor to subsequently provide the output voltage signal to the output buffer.

13. The method of claim 10, further comprising transmitting the input voltage signal through a buffer prior to selectively passing the input voltage to the first terminal of the voltage-controlled capacitor.

14. The method of claim 10 adapted to perform correlated double sampling.

15. The method of claim 14, wherein generating the input voltage signal comprises:

charging a first terminal of an input capacitor and the first terminal of the voltage-controlled capacitor to a precharging voltage, wherein the first terminal of the input capacitor and the first terminal of the voltage-controlled capacitor are selectably connected; and charging a second terminal of the input capacitor to a reset voltage whilst maintaining the precharging voltage at the first terminal of the input capacitor and the first terminal of the voltage-controlled capacitor.

16. The method of claim 15, wherein selectively passing the input voltage signal to the first terminal of the voltage-controlled capacitor comprises:

disconnecting the precharging voltage from the first terminal of the input capacitor and the first terminal of the voltage-controlled capacitor;

applying the input voltage signal to the second terminal of the input capacitor thus coupling the difference between the input voltage signal and the reset voltage to the first terminal of the input capacitor, thereby shifting the level of the precharging voltage by a proportion of the difference between the input voltage signal and the reset voltage to generate a difference voltage at the first terminal of the input capacitor; and selectively passing the difference voltage to the first terminal of the voltage-controlled capacitor.

17. The method of claim 14, wherein varying the capacitance of the voltage-controlled capacitor comprises varying the capacitance of the voltage-controlled capacitor between a first capacitance and a second capacitance, thereby subjecting the difference voltage to a gain to generate the output voltage signal.

* * * * *